United States Patent [19]
Rowan et al.

[11] Patent Number: 4,996,470
[45] Date of Patent: Feb. 26, 1991

[54] ELECTRIC MOTOR SPEED CONTROL APPARATUS AND METHOD

[75] Inventors: Timothy M. Rowan; John C. Merrison, both of Wauwatosa, Wis.

[73] Assignee: Allen-Bradley Company, Inc., Milwaukee, Wis.

[21] Appl. No.: 380,050

[22] Filed: Jul. 14, 1989

[51] Int. Cl.[5] .................................................. H02P 5/40
[52] U.S. Cl. .................................... 318/772; 318/802; 318/757
[58] Field of Search ............... 318/696, 685, 474, 763, 318/376, 810, 762, 802, 375, 759, 758, 772, 732

[56] References Cited

U.S. PATENT DOCUMENTS

| | | | |
|---|---|---|---|
| 3,665,273 | 5/1972 | Enslin | 318/227 |
| 3,908,158 | 9/1975 | Studtmann | 318/227 |
| 4,070,605 | 1/1978 | Hoeppner | 318/227 |
| 4,176,306 | 11/1979 | Asano et al. | 318/772 |
| 4,461,985 | 7/1984 | Stitt | 318/727 |
| 4,481,456 | 11/1984 | Meyerand, Jr. et al. | 318/800 |
| 4,491,197 | 1/1985 | Nishiwaki | 187/29 R |
| 4,524,316 | 6/1985 | Brown et al. | 318/809 |
| 4,833,386 | 5/1989 | Unsworth | 318/729 |
| 4,862,052 | 8/1989 | Unsworth et al. | 318/763 |

OTHER PUBLICATIONS

"Low Cost Electronic Speed Controller for Small Induction Motors," conference in London, England, Sep. 25–27, 1979.

Primary Examiner—William M. Shoop, Jr.
Assistant Examiner—John W. Cabeca
Attorney, Agent, or Firm—Quarles & Brady

[57] ABSTRACT

The speed of an induction motor is reduced by initially using dynamic electrical braking to slow the motor to a speed at which it will not remain synchronized to the A.C. supply frequency. At this point, A.C. cycle skipping is employed to apply current to the motor at an effective frequency which is a fundamental frequency component of the A.C. supply line frequency. The motor becomes synchronized at this fundamental frequency component. If desired, the motor can be brought to a complete stop by discontinuing the cycle skipping and using the dynamic braking again for a given period of time. This technique provides a very controlled stopping of the motor enabling equipment driven by the motor to be accurately positioned.

19 Claims, 5 Drawing Sheets

ELECTRIC MOTOR SPEED CONTROL APPARATUS AND METHOD

BACKGROUND OF THE INVENTION

The present invention relates to techniques for changing the speed of an electric motor, such as bringing the motor to a gradual controlled stop; and particularly to such techniques and the apparatus for practicing them which employ a combination of dynamic braking and "cycle-skipping" speed control.

When an electric motor drives components of automated manufacturing equipment, the motor often must be precisely controlled to accurately position a workpiece with respect to other components of the manufacturing equipment. For example, an assembly line may transfer a workpiece from one work station to another using a conveyor belt or similar apparatus. As the workpiece nears the next station, the motor must be stopped so that the assembly line positions the workpiece accurately with respect to the next work station.

In order to achieve maximum operating efficiency of the assembly line, it is desirable to transfer the workpieces as fast as possible between the different work stations. However, the higher the motor speed, the greater the inaccuracy in stopping the motor to position the workpiece at the next station. Therefore, the designer of an assembly line control system is left with a trade-off between a high workpiece transfer rate with a relatively low positioning accuracy and increasing the positioning accuracy by slowing the workpiece transfer rate.

Various types of motor braking techniques have been employed to rapidly stop an electric motor in a manner which provides some degree of control over that operation. An example of such a device is disclosed in U.S. patent application Ser. No. 07/103,729 entitled "Apparatus and Method for Braking an Electric Motor" and assigned to the same assignee as the present invention. This type of dynamic braking applied pulses of the alternating current from a motor supply through the motor windings at selected points in time to produce an electromagnetic force that opposed the electromagnetic force due to the magnetism of the motor's rotor. The opposing magnetic fields generated a negative torque within the motor which slowed its speed.

Although such forms of dynamic braking provided a greater degree of control over the positioning of workpieces than was achieved by merely allowing the motor to coast to a stop, a certain degree of inaccuracy still existed when the workpieces were being transferred at a relatively high speed. Depending upon the tolerances required for the processing along the assembly line, even when dynamic braking was employed, an unacceptably large positioning tolerance could exist. In addition, dynamic braking alone may not provide as smooth a slowing of the motor as is required.

Assembly lines typically use AC induction motors in which the speed of operation is synchronized to the frequency (50 or 60 Hz.) of the alternating current supplied to the motor. Merely controlling the voltage or current applied to the motor does not provide an effective way to alter its speed, since the speed is dependent upon the frequency of the alternating current which remains constant despite fluctuations in the voltage until the motor stalls. In order to control the speed of an induction motor, various techniques for changing the frequency of the current applied to the motor have been devised. Many of the these techniques involve relatively complex electronic control circuits for converting the standard alternating current supply frequency into different frequencies for controlling the speed of the motor.

A technique commonly referred to as "Cycle-Skipping" was developed, as an alternative to the relatively elaborate and expensive A.C. frequency conversion apparatus. In this technique, thyristors couple the source of alternating current to the motor and are switched at proper points in time to generate a fundamental frequency component of the alternating supply current. An example of this cycle-skipping method is disclosed in U.S. Pat. No. 4,176,306 entitled "Speed Control Apparatus." The technique described in this patent triggers the thyristor for a phase line of the alternating current supply during several consecutive positive half-cycles of the A.C. voltage for that supply line, and then it is not triggered for one or more cycles of the supply voltage. Next, the thyristor is triggered during several consecutive negative half-cycles of the supply line voltage. This pattern repeats with a pause of one or more cycles between each pattern. The thyristors for the other two phase lines in a three-phase circuit are fired in the same pattern, but 120 degrees out of phase. The pattern applies current to the motor having an effective frequency which is a fraction of the A.C. supply frequency. The motor synchronizes to this lower frequency and runs at a slower speed.

However, merely changing the thyristor firing from occurring every cycle to a cycle-skipping pattern by itself was insufficient to produce a reduction in the speed of the induction motor, since the waveform of the current produced by the cycle-skipping still has a component of the original supply frequency (50 or 60 Hz.). Therefore, in order to break the motor out of synchronism with the A.C. supply frequency, the motor control circuit provided a switch mechanism, such as a contactor, to reverse the connections of the three-phase A.C. supply lines to the motor. The contactor mechanism had to be switched to alter the supply line connections to the motor according to the mode at which the thyristors were being controlled.

SUMMARY OF THE INVENTION

A system for controlling the speed of an induction electric motor is improved by incorporating a mechanism for reducing the speed of the motor without the need of an additional switch device to reverse the connections of the motor to an A.C. power source.

When speed reduction is desired, the controller initially enters a dynamic braking mode. In this phase of operation, pulses of electricity from the power source are applied to the motor at times which will produce a negative torque. These times are determined by comparing the polarities of the source voltage and the voltage induced in a winding of the motor by a back electromotive force (emf). The braking electricity is applied when these voltage polarities are opposing.

As the motor begins to slow, the electricity is applied more frequently. When the braking electricity is applied at least every given number of cycles of the alternating source voltage, the dynamic braking is discontinued and an A.C. cycle skipping mode is entered. In this phase, current is sent through each motor winding in a specific pattern to apply the electricity at an effective frequency which is a fundamental component of the A.C. source frequency. This mode can be entered only after the dynamic braking has slowed the speed to the point where the motor will not remain synchronized to the A.C. source frequency. This speed is determined from the interval between the dynamic braking mode current pulses.

If continued operation at this lower speed is desired, the cycle skipping mode continues indefinitely. However, one use of the present technique is to reduce the speed of the motor prior to bringing it to a complete stop. This prereduction in speed allows greater control over the stopping process to more accurately position equipment driven by the motor.

In this application of the present technique, the motor will become synchronized to the fundamental component frequency produced by the A.C. cycle skipping. Thereafter, when the driven equipment is close to the desired position, a sensor triggers the motor controller to enter a second dynamic braking mode. In this phase, the motor is brought to a stop by applying current from the power source during every consecutive positive or negative half-cycle of the alternating source voltage. This final phase continues for a given interval or until the motor stoppage is detected by some means.

An object of the present invention is to provide a mechanism which allows motor speed reduction using cycle skipping without having to use additional switches in the motor circuit.

Another object is to incorporate dynamic braking to slow the motor to a speed where it will not remain synchronized to the frequency of an A.C. source when the cycle skipping is applied.

A further object is to provide a means for bringing the motor to a full stop in a manner in which accurately positions equipment driven by the motor.

DETAILED DESCRIPTION OF THE INVENTION

Figure 1:
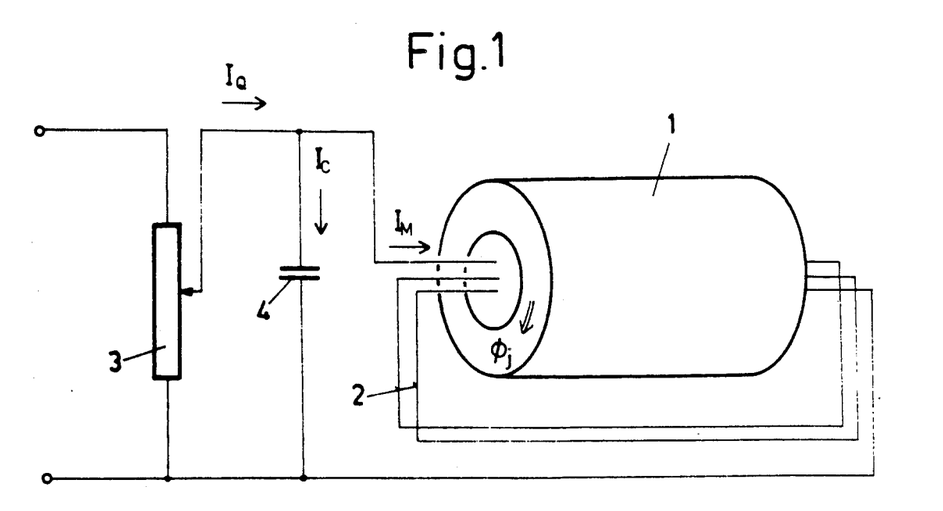
FIG. 1 is a schematic diagram illustrating an electric motor and a motor controller for practicing the present invention.

With initial reference to FIG. 1, a three-phase electric motor 10 has three stator windings 11, 12 and 13. The application of electricity to the motor 10 is regulated by a motor controller 20 and its thyristor switch module 14. The switch module 14 includes three pairs of SCR's 16, 17, and 18 with the SCR's in each pair connected in an inverse-parallel relationship. Each SCR pair couples one of the stator windings 11, 12 or 13 to a supply line A, B, or C from a source of three-phase alternating electricity. The voltage across each pair combination of the supply lines has a frequency of 50 or 60 Hz.

The SCR pairs 16–18 are triggered, or fired, by a control circuit that includes a microcomputer 21, three zero crossing detectors 22, 23, and 24, and two voltage comparators 25 and 29. The microcomputer 21 may be a 6801 type sold by Hitachi America, Ltd., which contains a microprocessor, timer circuits, a read only memory, and a random access memory in the same integrated circuit package. A computer program which defines the operation of the motor controller 20 is stored in the computer's read only memory. This program is similar to those used with conventional programmable motor controllers insofar as the functions of starting and operating the motor 10 at a normal running speed. As will be explained in detail, the program contains a novel routine for reducing the speed of the motor 10 and for slowing the motor to a stop.

The microcomputer 21 generates properly timed thyristor trigger signals on three lines 26, 27, and 28 of a parallel output port. The first output line 26 is coupled by a first conventional isolation transformer 31 to the gate terminals of the first pair of SCR's 16 for electricity supply line A. The other trigger signal output lines 27 and 28 are coupled by similar isolation transformers 32 and 33 to the gate terminals of the second and third SCR pairs 17 and 18, respectively, for electricity supply lines B and C.

Three terminals 41, 42, and 43 couple the stator windings 11, 12 and 13 to the motor controller 20. Three equal value resistors 34–36 are coupled to these terminals 41–43 in a Y connection with the common node 37 of the Y connected to the ground of the controller circuit. The voltage across each resistor 34, 35, and 36 equals the voltage Va, Vb, and Vc across the three stator windings 11, 12, and 13, respectively. The potential at the common node 37 of the Y resistor connection is the same as the neutral node 15 of the motor windings, which is substantially equal to the neutral potential of the A.C. supply.

The first voltage comparator 25 senses the voltage Vc across the third stator winding 13. Specifically, the non-inverting input of voltage comparator 25 is coupled to the third stator winding terminal 43 by a voltage divider 30 which reduces the stator winding voltage to a level compatible with the comparator. The inverting input of voltage comparator 25 is connected to the circuit ground. Voltage comparator 25 is employed to produce an output which indicates the polarity of the back emf voltage across the third motor winding 13, i.e., whether the voltage is above or below the neutral potential, as will be described. The output of the first comparator 25 is connected to a parallel input port line of the microcomputer 21.

The second voltage comparator 29 is coupled by voltage divider 38 to the first terminal 41 to similarly sense the polarity of the voltage Va across the first stator winding 11. The output of the second voltage comparator is connected to another line of the microcomputer parallel input port to provide an indication of the back emf voltage across the first stator winding, as will be described.

The A, B, and C supply lines are coupled by separate resistors 45, 46, and 47 to the inputs of the three zero crossing detectors 22, 23, and 24. Three additional resistors 48, 49 and 50 couple the inputs of the zero crossing detectors to the controller circuit ground, thereby forming voltage dividers with resistors 45–47. The first zero crossing detector 22 is connected to resistors 45 and 46 to sense when the voltage Vab across supply lines A and B goes through zero. Similarly the second zero crossing detector 23 is connected to the resistors 46 and 47 to sense zero excursions of the voltage Vbc across supply lines B and C, while the third detector 24 senses zero crossings of the voltage Vac across supply lines A and C. Each of the zero crossing detectors 22-24 has two outputs coupled to the microcomputer 21. One of these outputs indicates a negative to positive transition of the associated voltage and the other output indicates a positive to negative transition.

Additional input port lines of the microcomputer 21 are connected to a manual pushbutton switch 52 and to two limit switches 53 and 54. These input port lines are also coupled by a three pull-up resistors 56-58 to the positive voltage supply for the motor controller 20. Activation of one of these switches 52-54 pulls the corresponding microcomputer input line to ground. The pushbutton switch 52 is activated by an operator to start the motor 10 and generates a signal designated START which results in the microcomputer 21 executing a conventional software routine for starting and controlling the normal running of the motor 10. The two limit switches 53 and 54 are positioned on an assembly line, for example, to detect when a workpiece is at given location along the line and to control the motor braking function, as will be described.

Figure 2:
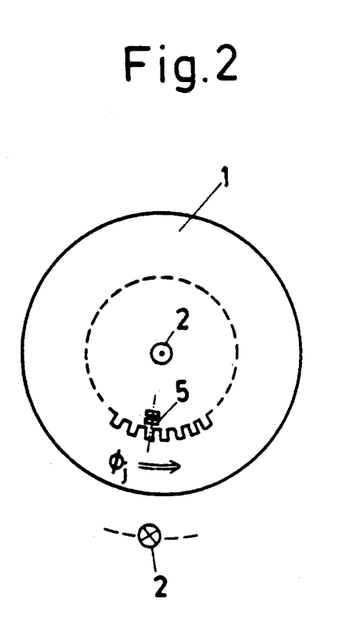
FIG. 2 is a graph of the motor speed versus time.

FIG. 2 graphically depicts the speed of the motor and of equipment being driven by the motor, such as an assembly line conveyor. Initially, prior to time $T_0$, the motor is operating at full speed. In this mode of operation, the SCR's 16-18 of the motor controller are conductive for the entire half-cycle of the corresponding AC supply voltages during which they are forward-biased At time $T_0$, the first limit switch 53 on the assembly line is closed by a workpiece moving past the position at which the limit switch is located. The microcomputer 21 responds to the closure of the first limit switch by commencing dynamic braking of the electric motor.

The dynamic braking technique involves applying current pulses to the motor 10 at specific times to generate an electromagnetic field which produces a negative motor torque thereby slowing the motor's rotor. It has been determined that this can be achieved by applying the electricity when the polarity of its instantaneous voltage is opposite to the polarity of the back electromotive force (emf) induced voltage in the motor (i.e. one of these voltages is positive and the other is negative with respect to the supply's neutral potential). The back emf results from the magnetism of the rotor and the rotating magnetic field produced by that magnetism as the rotor slows. As used herein, the terms "back emf voltage" and "back emf induced voltage" refer to the voltage induced in a winding of the motor by this rotating magnetic field at periods when electricity from the supply lines is not being applied to the motor.

Specifically, referring to FIG. 1, the back emf induced voltage Vc across the third stator coil 13 is sensed by the first voltage comparator 25. The output of voltage comparator 25 represents the polarity of the sensed back emf induced voltage. The polarity of the alternating supply voltage Vab across lines A and B is indicated by the output line of the AB zero crossing detector 22 which is active. After each zero voltage crossing of the supply voltage Vab, the microcomputer 21 examines the polarity of the two sensed voltage samples. If the polarities are opposite (i.e. one is positive and the other negative with respect to circuit ground), the pairs of SCR's 16 and 17 for the A and B supply lines are triggered by a short pulse applied to their gate electrodes after a fixed delay from the occurrence of the zero crossing. The delay can be set to any interval up to almost one half the period of the alternating supply voltage. The shorter the delay the more current is applied to the motor 10 and the greater the braking effect. Once triggered, the pairs of SCR's 16 and 17 apply current to the motor until the alternating supply current Iab passes through zero amperes, at which point the SCR's automatically turn off until triggered again by the microcomputer 21.

As the motor 10 slows down, the phase relationship between the back emf voltage Vc and the supply line voltage Vab changes. As a result, the pairs of SCR's 16 and 17 are triggered more and more frequently thereby increasing the braking effort. Waveforms I and II of FIG. 3 conceptually illustrate the current Iab that flows through the first and second stator windings 11 and 12 at two progressively slower speeds during the braking. In waveform I, the first and second pairs of SCR's 16 and 17 are triggered only during an occasional positive half-cycle of the supply line voltage Vab. As the motor slows, the triggering occurs more frequently, as shown by waveform II. Additional SCR current patterns occur between those illustrated in FIG. 3.

The dynamic braking continues until time $T_1$ on FIG. 2, at which point the motor speed has slowed to approximately eighty percent of the speed prior to time $T_0$. This speed is indicated by the SCR's being triggered at a certain interval (e.g. every five cycles of the A.C. supply voltage, see waveform II of FIG. 3). At this speed, A.C. cycle-skipping may be commenced without the risk of the motor 10 remaining synchronized to the frequency of the A.C. supply voltage. At time $T_1$, the dynamic braking terminates and the controller begins AC cycle-skipping to reduce the speed of the motor further. This reduction continues until time $T_2$, at which point the motor becomes synchronized to the fundamental frequency component of the current produced by the cycle-skipping and thereafter operates at a constant speed determined by that fundamental frequency.

At time $T_3$, the workpiece closes the second limit switch 54, sending an active signal LS2 to the microcomputer 21. This causes the controller to cease the cycle skipping mode and commence a second phase of dynamic braking in which pulses of the A.C. supply current are applied to windings of the motor 10 during each cycle. After a brief interval, the motor 10 is brought to a complete stop at time $T_4$.

As can be seen from the graph of FIG. 2, the present stopping technique initially reduces the speed of the motor to a relatively slow speed from full speed operation. When the position of an object of an assembly line is close to its desired final position, a second limit switch causes a further reduction of the motor speed to zero. By using a combination of dynamic motor braking to break the motor out of synchronism with the supply line frequency and A.C. cycle-skipping to reduce the motor to a relatively low speed, the motor is slowed to a speed from which a very accurate final stoppage can occur to accurately position the workpiece.

Figure 4:
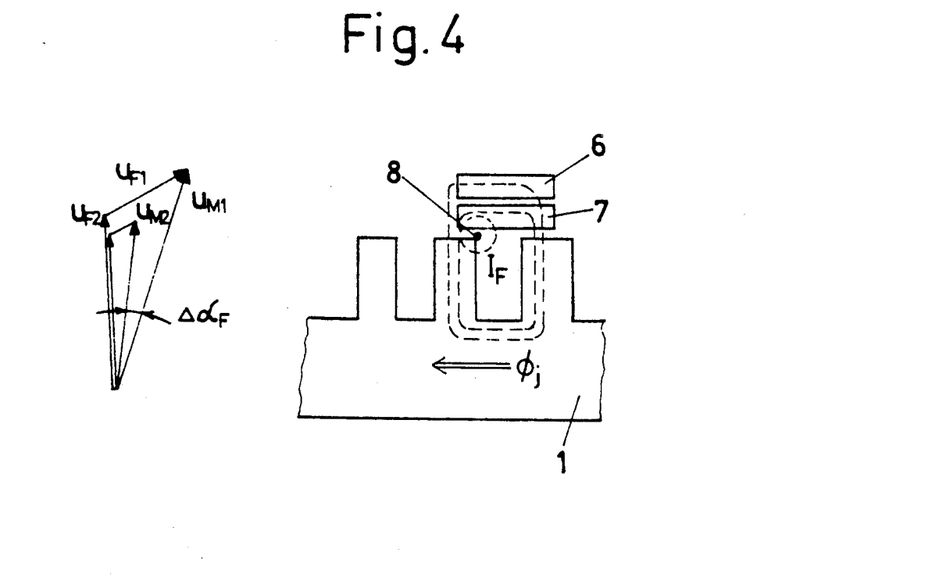
FIGS. 4A, 4B and 4C form a flowchart of the program for the motor controller to perform the speed reduction.
Figure 4A:
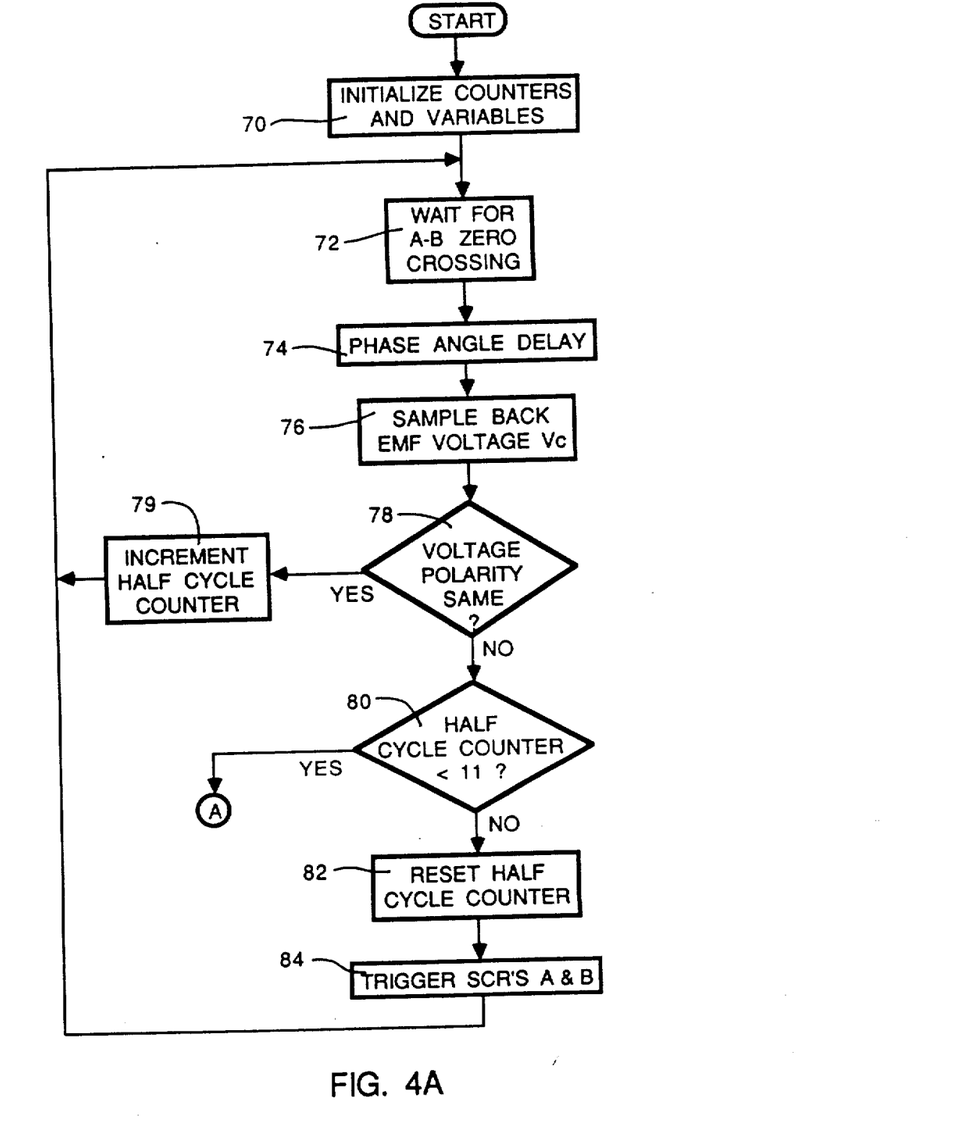
Figure 4B:
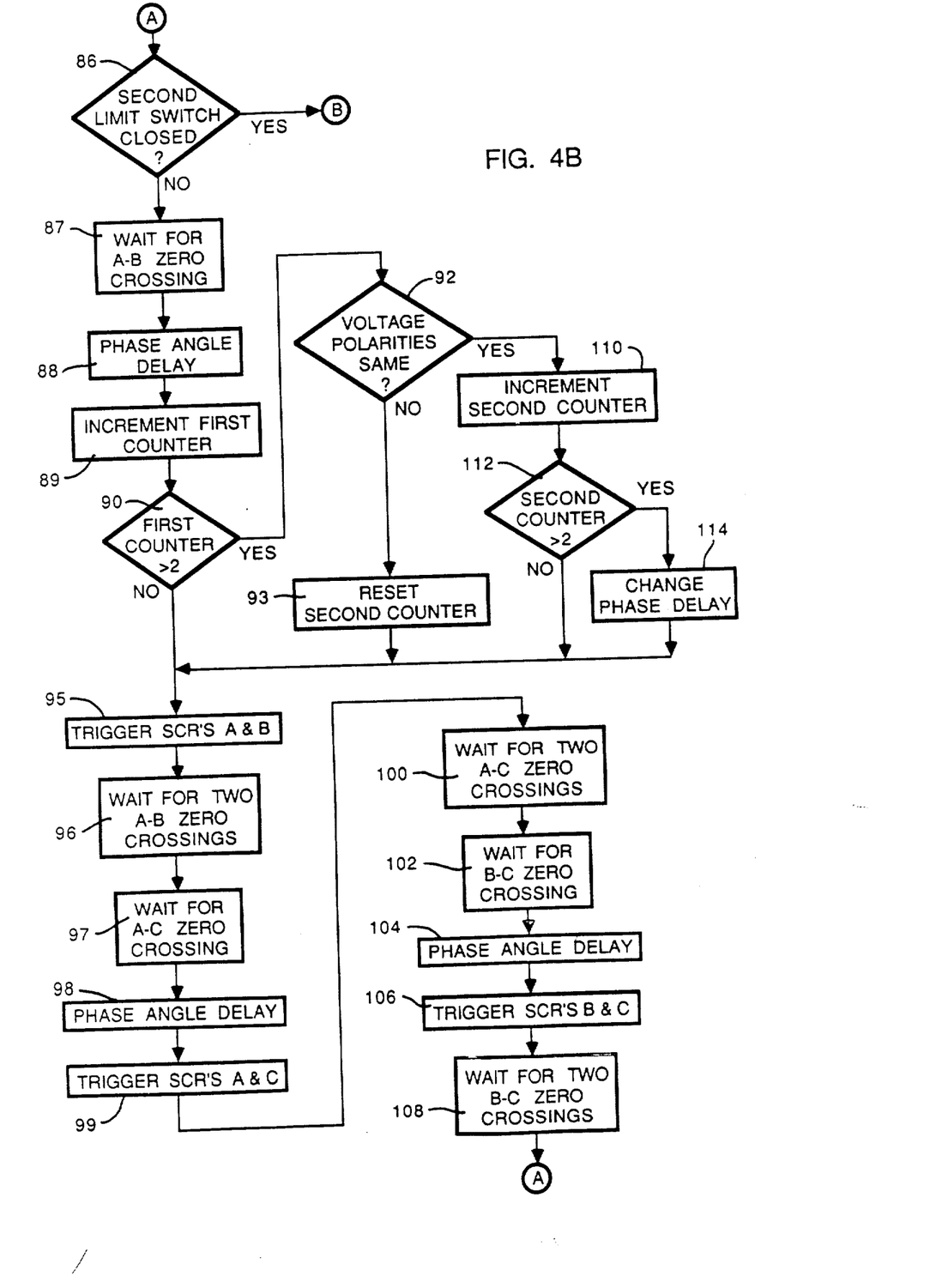
Figure 4C:
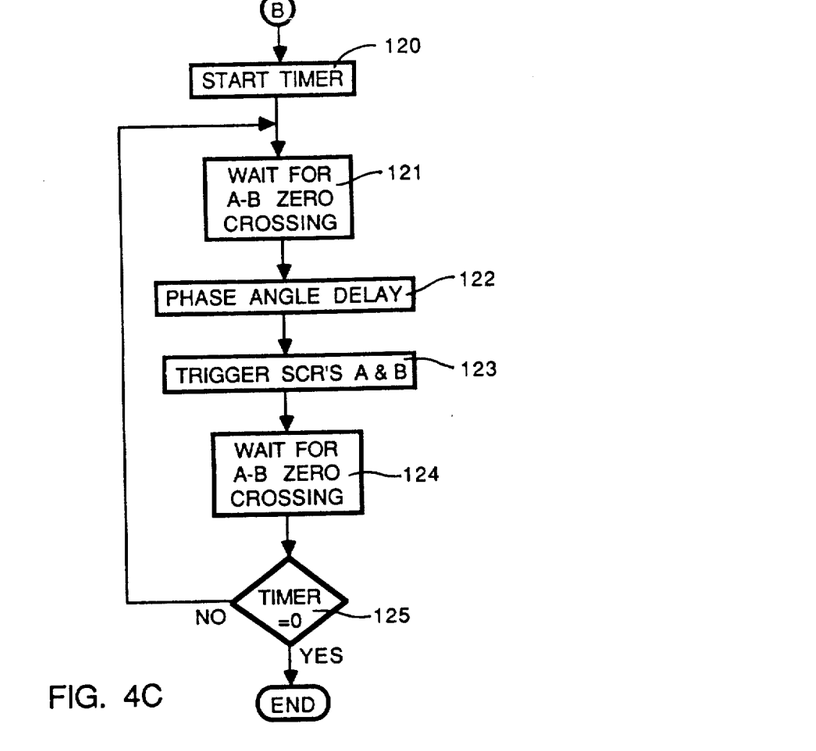

This speed reduction and stoppage of the electric motor is carried out by the motor controller 20 executing a speed reduction software routine depicted by the flowchart in FIGS. 4A-C. At time $T_0$ when the first limit switch 53 closes, the microcomputer 21 calls the motor speed reduction routine and commences executing step 70. At this juncture, the microcomputer initializes the interval variables and counters which will be used in executing the routine. Then, at step 72, the inputs from the AB zero crossing detector 22 are examined to determine if the voltage Vab across supply lines A and B has made a zero crossing. If a zero crossing has not occurred, the program execution loops continuously through step 72. Eventually, a zero voltage crossing will be detected, causing a flag to be set within the microcomputer memory, indicating whether the zero crossing is rising or falling, that is whether the voltage Vab is now negative or positive. The program execution then advances to step 74.

At step 74, the microcomputer 21 waits for a given amount of time, which provides a conventional phase angle delay before triggering the appropriate SCR's within the switch module 14. In determining the triggering time, a delay interval is added to the present value of the microcomputer's timer. The program execution holds at step 74 until it is time to fire the SCR's, at which point the value of the microcomputer's timer will equal the value of the addition.

At this point, the microcomputer samples the polarity of the back emf voltage Vc across the third winding 13 of the motor 10. The sampling is accomplished by sensing the output of the voltage comparator 25 and storing the output in a memory location within the microcomputer 21 at step 76. Then, the polarity of the sampled back emf voltage is compared to the polarity of the supply line voltage Vab at step 78. If the two voltage polarities are the same, i.e. they are both either positive or negative as compared to the potential at the motor's neutral node 15, the program execution branches to step where the microcomputer increments the contents of a counter address in its memory. This address location stores a count of the half-cycles of the supply line voltage, which occur between firings of the SCR's during the dynamic braking mode. The program execution then returns to step 72 to await another zero crossing of voltage Vab.

When the polarity of the supply line voltage Vab and the polarity of the back emf voltage across the third winding 13 are opposite in polarity, the SCR's 16 and 17 are triggered to apply a current Iab through motor windings 11 and 12 to produce a negative torque. When this occurs, the program execution advances to step 80 where the microcomputer 21 examines the contents of the half-cycle counter to determine if the counter has a value which is less than 11. During the initial phase of the motor speed reduction (between times $T_0$ and $T_1$) the counter's value when examined at step 80 will always be greater than 11. This causes the program execution to advance to step 82 where the half-cycle counter is reset to zero. Then, at step 84, the microcomputer generates output signals on lines 26 and 27 to trigger SCR pairs 16 and 17 for supply lines A and B. This triggering of the SCR's produces a current Iab within windings 11 and 12 of the motor which generates a magnetic field that is opposed to the magnetic field from the rotor of motor 10. The opposing magnetic fields produce a reduction in the speed of the motor.

Figure 3:
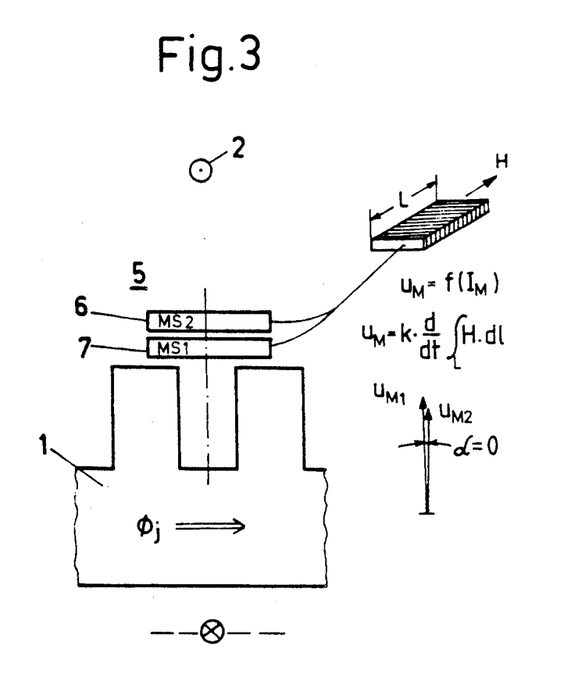
FIG. 3 is a conceptual illustration of the voltage waveform for one phase of the AC power to the motor, and waveforms of the current applied to brake the motor at three speeds as the motor slows.

As illustrated in the waveforms of FIG. 3, during this initial phase of the motor speed reduction, the current applied by the triggering of the SCR pairs 16 and 17 will produce current pulses, as indicated in waveform I, for example. At this juncture, the current pulses occur at intervals that are longer than five cycles of the supply line voltage Vab. As a result, the value of the half-cycle counter just prior to SCR triggering will be eleven or more. As the motor speed slows, the interval between when the A.C. supply line voltage is opposite to the polarity of the back emf voltage will decrease, resulting in a shortening of the period between triggering the SCR's. Eventually, the SCR's will be triggered every five cycles or less of the supply line voltage Vab as illustrated in waveform II of FIG. 3. This occurs at time $T_1$ illustrated on the graph of FIG. 2 at a point when the motor speed has reduced to approximately eighty percent of its full speed prior to time $T_0$. Therefore, at time $T_1$, the half-cycle counter will have a value less than eleven when it is examined at step 80 of the motor reduction routine illustrated on FIG. 4A. At this point, the program execution branches from step 80 to step 86 on FIG. 4B.

Figure 6:
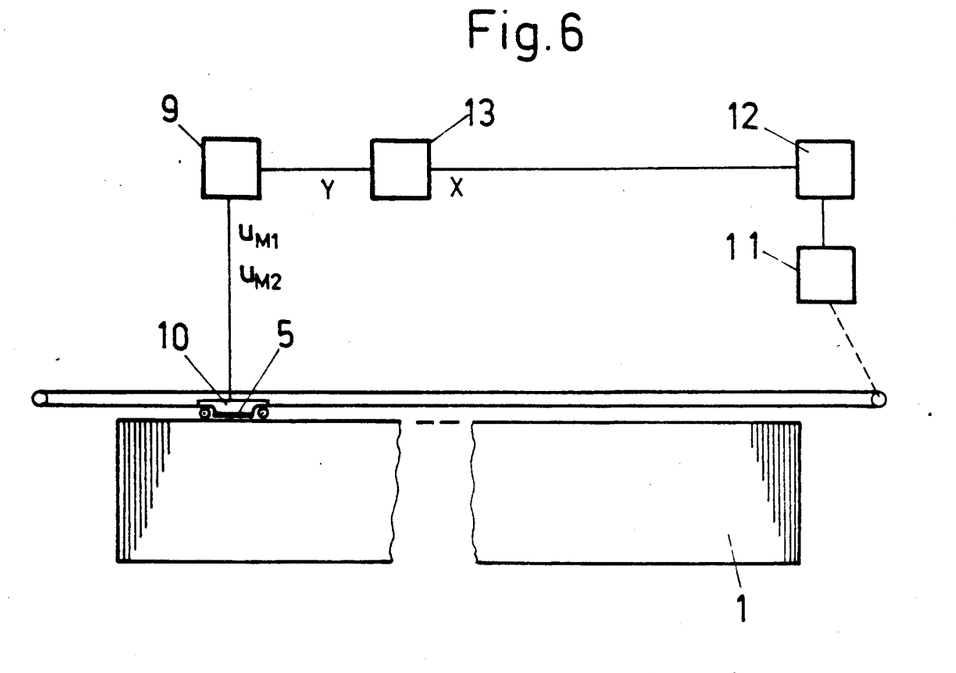
FIG. 6 is an illustration of the electric current waveforms for each AC phase line which is coupled to the motor.
Figure 7:
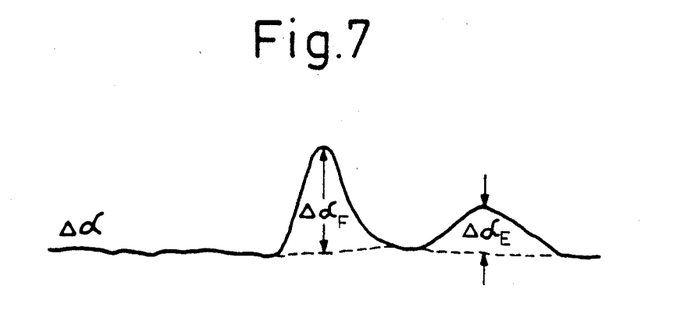

When the program branches at time $T_1$, it enters a mode of operation in which the dynamic braking ceases, and the motor is further reduced in speed by AC cycle-skipping. In this mode, each pair of SCR's 16-18 is selectively triggered in a pattern which effectively applies electricity to the motor at a fundamental component frequency equal to one-seventh the supply line frequency. Exemplary patterns of this triggering are shown in FIG. 6. With respect to waveform A, the first pair of SCR's 16 is initially triggered to produce two consecutive positive current pulses 61 and 62 in supply line A. Following pulse 62, the first pair of SCR's 16 is not triggered at all during the next full cycle of the electricity from the A supply line. After this hiatus in triggering, the first pair of SCR's 16 is triggered to produce two consecutive negative current pulses 63 and 64 in the A supply line. Following pulse 64 another one cycle hiatus occurs in triggering the first SCR pair 16. Thereafter, this pattern repeats as long as the controller is in the cycle skipping mode. The other two SCR pairs 17 and 18 for supply lines B and C are triggered in identical patterns, but 120 electrical degrees out of phase, as graphically illustrated in FIG. 6.

As noted by comparing the three waveforms in FIG. 6, when the current pulse 61 occurs in the first motor winding 11, a negative current 65 occurs in the second motor winding 12, as indicated beneath waveforms by the designation $A\overline{B}$. Then when the current pulse 62 occurs in the first motor winding 11, a negative current 65 occurs in the third motor winding 13, as indicated beneath waveforms by the designation $A\overline{C}$. The pattern of current pulses in the three motor windings comprise six intervals in which different combinations of two SCR pairs are triggered to send current through the motor. Each of these six intervals is 420 electrical degrees in duration.

Figure 5:
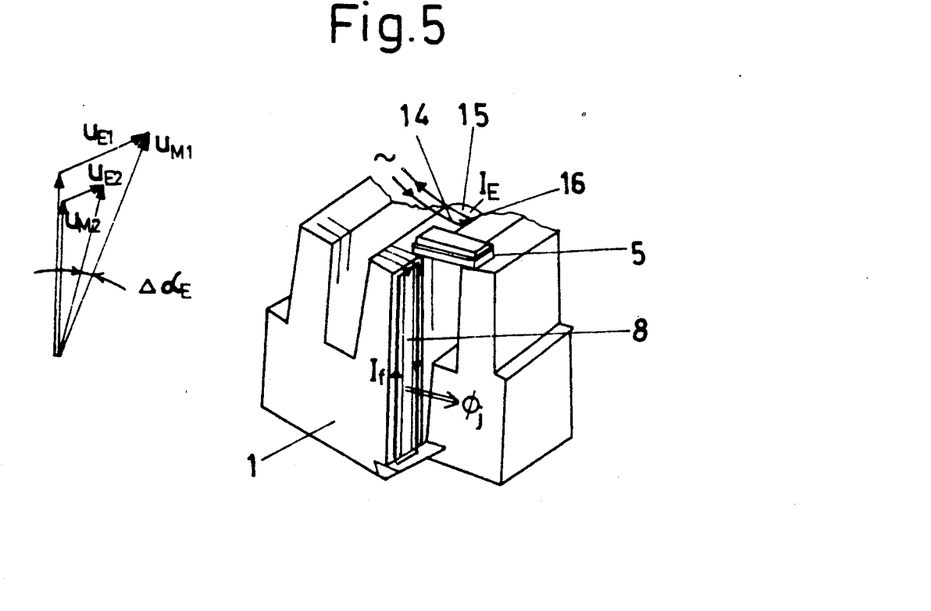
FIG. 5 is a current phase diagram illustrating the timing relationship at which the SCR's are triggered.

Another graphical representation of the triggering pattern to produce the one-seventh fundamental frequency component is provided by the voltage phase diagram in FIG. 5. This diagram illustrates the timing and phase relationship between the firing patterns in FIG. 6. The initial triggering of the SCR's which produces pulses 61 and 65 is depicted by arrow 66 at the inner-most point of the SCR firing spiral along the radial line designated $A\overline{B}$ (corresponding to the same designation in FIG. 6). It is understood that the SCR's are triggered slightly later than the zero crossing, after a conventional phase angle delay. After firing the first and second pairs of SCR's 16 and 17, a delay occurs for 420 degrees of the voltage waveform in the A supply line until a time indicated by the next arrow 67 around the spiral. At this point the first and third SCR pairs 16 and 18 are fired to produce a positive current pulse 62 through the A supply line and a negative current pulse 69 through the C supply line as indicated by the designation AC̄. This pattern of delaying 420 degrees between SCR triggering continues to produce the six variations of current flow through the three-phase motor 10, as indicated by the six radial lines in FIG. 5.

Referring again to FIG. 6, these SCR triggering patterns produce three effective current waveforms 68a, b, and c through the motor windings 11, 12, and 13 respectively. The effective frequency of the resultant current is one-seventh the frequency of the A.C. supply voltage. The application of this fundamental frequency component of the A.C. supply voltage frequency produces a further reduction in the speed of the motor until at time $T_2$ (see FIG. 2), the motor 10 becomes synchronized with this fundamental frequency component.

Although the present invention is being described in terms of a technique which employs a one-seventh fundamental frequency component, other fundamental frequency components can be used. Such frequencies are determined by the expression $f_s/(6n+1)$ where f is the frequency of the supply voltage and n is a positive integer. In a technique which brings the motor to a stop, the 1/7 and 1/13 fundamental frequency components are preferred as lower frequencies drive the motor at too slow a speed for most practical applications. In generating the 1/13 fractional frequency, the SCR's for each supply line are triggered in a pattern of four positive current pulses, then not triggered for two supply cycles, triggered for four negative current pulses, and then another two cycle non-triggered interval. This is a doubling of the patterns illustrated in FIG. 6.

The portion of the motor speed reduction program shown on FIG. 4B controls triggering the SCR pairs 16–18 to achieve the cycle-skipping by which a fundamental frequency component is produced. This portion of the software program commences at step 86, where the input from the second limit switch 54 is tested to determine if the limit switch is closed, as occurs at time $T_3$ in the graph of FIG. 2. Obviously when this portion of the program is first executed at time $T_1$, the second limit switch 54 will be open and the program will advance to step 87, where the program waits for a zero crossing of the voltage Vab across supply lines A and B.

When this voltage crossing occurs, the microcomputer 21 enters a timed loop at step 88, which provides a phase angle delay between the zero crossing of the supply voltage Vab and the triggering of the SCR's. Once this delay interval has elapsed, a first counter is incremented at step 89, and the resultant value is tested at step 90 to determine if it is greater than 2. The first counter provides an inhibiting mechanism for the portion of the program which tests to determine when the motor has synchronized to the fundamental frequency component (as occurs at time $T_2$). The testing is inhibited for one cycle of the fundamental frequency component following the transition into the cycle-skipping mode at time $T_1$, so that voltage transients in the back emf will not cause an erroneous determination that the motor has become synchronized to this fundamental frequency component. Therefore, for two voltage crossings of the fundamental frequency component applied to winding 11 of the motor (two passes through the program loop on FIG. 4B), this motor synchronization detection is inhibited, and the program execution advances directly to step 95.

At this time, the SCR's for supply lines A and B, SCR's 16 and 17, are triggered at step 95 by the microcomputer issuing output pulses on lines 26 and 27. This produces the current pulses 61 and 65 depicted on FIG. 6, which result in a positive current flow through the first winding 11 of the motor and a negative current flow through the second winding 12. Thus current Iab flows through the motor 10 (FIG. 1).

After the SCR's for the supply lines A and B have been triggered, the microcomputer 21 waits for two zero crossings of the supply voltage Vab. This pause at step 96 provides a delay of 360 degrees of that supply voltage. This delay period is provided by the microcomputer 21, sensing the two input lines from the AB zero crossing detector 22. After the second zero voltage crossing, the microcomputer 21 awaits a zero crossing signal provided by the AC zero crossing detector 24 for supply voltage Vac at step 97. As noted previously, this zero crossing occurs 420 electrical degrees from the zero crossing which produced the triggering of the previous SCR pairs 16 and 17. Upon detection of the zero crossing in the voltage Vac, the microcomputer times the phase delay at step 98 before triggering SCR pairs 16 and 18 for supply lines A and C at step 99. This triggering of the first and third SCR pairs 16 and 18 produces the current pulses 62 and 69 illustrated in FIG. 6, which cause a positive current to flow through the first winding 11 of the motor and a negative current to flow through its third winding 13, as designated by the legend AC̄.

The program execution then waits for two more zero crossings of the voltage Vac across supply lines A and C to provide another 360 degree delay. After this delay at step 100, the program advances to step 102, where the microcomputer 21 begins sensing the output from the BC zero crossing detector 23 to determine when the next zero crossing occurs in the supply voltage Vbc. Upon the occurrence of that zero crossing, the microcomputer 21 times the phase delay at step 104 before triggering the SCR's for supply lines B and C, SCR pairs 17 and 18 at step 106. After firing these SCR's, the program then waits for two consecutive zero crossings of the voltage Vbc across supply lines B and C at step 108 before returning to step 86 to repeat the process.

Each pass through the motor control program loop on FIG. 4B triggers the SCR pairs 16–18 to produce one half-cycle of the fundamental frequency component 68a, b, and c at each motor terminal 41, 42 and 43. On the subsequent pass through the program loop, the opposite polarity half-cycle of the fundamental frequency is generated.

As noted above, during the first two passes through the loop of the motor control program flowcharted on FIG. 4B, the program execution advances directly from step 90 to step 95 bypassing the portion which detects when the motor becomes synchronized to the fundamental frequency component at time $T_2$. After the first cycle of this fundamental frequency has been generated, the first counter will have a value greater than two. Thereafter, just prior to triggering the SCR's in module 14 to produce the first of the pair of positive or negative current pulses in the A supply line (e.g. pulses 61' and 65'), a test is made to determine whether the motor has become synchronized to this lower frequency. This test is accomplished by comparing the polarity of the supply line voltage Vab to the voltage induced in the first winding 11 of the motor by the back emf when no supply current is flowing through that winding.

Therefore, when the first counter has a value greater than two, the program branches from step 90 to step 92 to sense the input from the second voltage comparator 29, which indicates the polarity of the back emf induced in the first motor winding 11. At the same time, the output from the AB zero crossing detector 22 is examined to determine whether the polarity of the supply line voltage Vab is positive or negative. As the motor 10 is slowing in speed from time $T_1$, it is in a regenerating mode with the speed being higher than the synchronous speed of the motor for the fundamental frequency component being applied to the motor. In this mode, the back emf voltage leads the applied current by greater than 90 degrees, but less than 180 degrees. Therefore, the back emf voltage will be opposite in polarity to the polarity of the supply line voltage Vab as referenced to the neutral node 15 of the motor 10. Prior to time $T_2$, these polarities will not be the same, and a second counter is reset to zero at step 93 before the program execution advances to step 95 to continue the SCR triggering pattern.

At time $T_2$ on FIG. 2, the motor 10 becomes synchronized to the fundamental frequency component of the AC supply line frequency and the back emf voltage leads the current by less than 90 degrees, thereby having the same polarity as the supply line voltage Vab at step 92. At this point, the program execution branches to step 110, where the second counter is incremented and then tested at step 112 to determine if the count is greater than two. The second counter provides another delay of one cycle of the fundamental frequency component before reaching a determination that the motor has become synchronized with that lower frequency. This delay prevents a transient voltage from producing a false determination that the motor is synchronized. If the back emf and supply line voltage polarities remain the same for one cycle of the fundamental frequency component, the program will branch to step 114 where the triggering pattern is altered by changing the phase angle delay. For example, if less torque is required to drive the motor 10 at a constant speed than was required to produce the speed reduction between times $T_1$ and $T_2$, the phase angle delay is increased to produce a lower positive torque in the motor. Alternatively, instead of changing the triggering phase angle, the controller can alter the cycle skipping to shift to an even slower speed by generating a lower fundamental frequency component.

The program continues looping through the portion depicted on FIG. 4B until the second limit switch closes at time $T_3$. In the previously described example, the second limit switch 54 closes when the workpiece is relatively close to its desired position with respect to the next work station on the assembly line. The closure of the second limit switch is detected at step 86, and the execution of the program by microprocessor 21 branches to the section illustrated on FIG. 4C. At this point, another dynamic braking routine is initiated to send current through the first and second windings 11 and 12 of the motor during consecutive positive or negative half-cycles of the A.C. voltage across supply lines A and B, as depicted by waveform III in FIG. 3. At this point in time, the motor has slowed significantly so that such application of electricity will rapidly reduce the speed the the motor to a stop.

As indicated on FIG. 4C, this process is carried for a predefined interval, which is established by setting a timer within the microcomputer 21 at step 120. Then, the program waits at step 121 for a zero crossing of the voltage Vab across the A and B supply lines. Upon detection of that crossing, the microcomputer pauses for a phase angle delay at step 122 before triggering SCR pairs 16 and 17 for the A and B supply lines. The program then waits at step 124 for the next zero crossing, which occurs when the voltage Vab goes through the opposite half-cycle to the one during which the SCR's are being triggered. The timer is then examined at step 125 to determine if it has reached zero. If the time has not elapsed, the program execution returns to step 121 to again fire the SCR's to produce a continuous dynamic braking function. Eventually, the predefined time interval for this continuous braking mode will be reached, and the timer will have a zero value at step 125, causing the program execution to end. Instead of carrying out the second dynamic braking mode for a timed interval, a mechanism can be provided to detect when the motor has stopped and terminate the braking.

We claim:

1. An apparatus for controlling the speed of an electric motor which is supplied by a three-phase source of alternating electricity, the voltage of which has a frequency f, said apparatus comprising:
   three bidirectional switch means, each coupling one of the phases of the source to a winding of the electric motor;
   a brake means for reducing the speed of the motor to a predetermined level;
   first means for detecting when the speed of the motor is below the predetermined level; and
   first means for activating said switch means to apply electricity from the source to the motor in response to the speed of the motor being below the predetermined level, the activation producing a periodic pattern of current pulses which produce an effective alternating current through the motor at a fundamental frequency component of the source voltage frequency, which is equal to $f/(6n+1)$ where n is a positive integer.

2. The apparatus as recited in claim 1 further comprising:
   second means for detecting when the speed of the motor becomes synchronized to the fundamental frequency component; and
   means for altering the periodic pattern of current pulses in response to said second means for detecting.

3. The apparatus as recited in claim 2 wherein said means for altering the periodic pattern of current pulses causes said first means for activating said switch means to produce another fundamental frequency component of the source voltage frequency.

4. The apparatus as recited in claim 2 wherein the periodic pattern of current pulses is altered by changing a phase angle at which said switch means are activated.

5. The apparatus as recited in claim 1 further comprising:
   means for deactivating said first means for activating said switch means; and
   second means for activating said switch means during alternate half-cycles of the voltage from the source when said first means for activating said switch means is deactivated.

6. The apparatus as recited in claim 5 further comprising means for deactivating said second means for activating said switch means after a given interval of time has elapsed.

7. The apparatus as recited in claim 1 further comprising:

means for sensing the polarity of the voltage from the source;

means for sensing the polarity of back emf voltage induced in a winding of the motor; and wherein said brake means includes second means for activating said switch means to apply electric to the motor in response to the polarity of the voltage from the source being opposite to the polarity of the sensed back emf voltage, the application of electricity to the motor producing a reduction in motor speed.

8. The apparatus as recited in claim 7 further comprising means for producing an indicia of both the sensed back emf voltage and the sensed voltage from the source having the same polarity when said first means activates said switch means; and wherein said first means for activating said switch means responds to the indicia by altering the periodic pattern of current pulses.

9. A method for controlling the speed of an electric motor which is supplied by a source of alternating electricity, the voltage of which has a frequency f, the method comprising the steps of:

(a) reducing the speed of the motor by applying electricity from the source to the motor in a manner which produces a negative torque;

(b) detecting when the speed of the motor is below a predefined level; and thereafter (c) terminating the step of reducing the speed of the motor; and (d) applying electricity from the source to the motor in the form of a periodic pattern of current pulses which produces an effective alternating current through the motor at an effective frequency equal to $f/(6n+1)$, where n is a positive integer.

10. The method as recited in claim 9 further comprising the steps of:

(e) discontinuing the application of a periodic pattern of current pulses upon the occurrence of a predefined event; and thereafter (f) applying electricity from the source to the motor during alternate half-cycles of the source voltage until the motor has substantially stopped.

11. The method as recited in claim 9 further comprising the steps of:

(e) discontinuing the application of a periodic pattern of current pulses upon the occurrence of a predefined event; and thereafter (f) applying electricity from the source to the motor during alternate half-cycles of the source voltage for a given interval of time.

12. The method as recited in claim 9 further comprising the steps of:

(e) during the application of a periodic pattern of current pulses, sensing when a back emf voltage and the voltage from the source have the same polarity; and thereafter (f) altering the periodic pattern of current pulses.

13. The method as recited in claim 9 wherein the step of reducing the speed of the motor includes:

sensing the polarity of the voltage from the source of alternating electricity;

sensing the polarity of back emf voltage induced in the motor; and applying electricity from the source to the motor in response to the polarity of the voltage from the source being opposite to the polarity of the sensed back emf voltage.

14. An apparatus for controlling the speed of a three-phase electric motor which is supplied by a source of alternating electricity, the voltage of which has a frequency f, said apparatus comprising:

first means for sensing the polarity of the voltage from the source of alternating electricity;

second means for sensing the polarity of back emf voltage induced in at least one winding of the motor;

means for detecting when the speed of the motor is below a predetermined level;

switch means for selectively applying electricity from the source to the motor;

a first means for controlling said switch means when the speed of the motor is above the predetermined level and in response to the polarity of the voltage from the source being opposite to the polarity of the sensed back emf voltage, so that electricity is applied to produce a reduction in motor speed; and a second means for controlling said switch means when the speed of the motor is below the predetermined level to apply electricity to the motor in the form of a periodic pattern of current pulses which produce an effective alternating current through each winding of the motor at a fundamental frequency component of the source voltage frequency, which is equal to $f/(6n+1)$ where n is a positive integer.

15. The apparatus as recited in claim 14 wherein said means for detecting when the speed of the motor is below a predetermined level comprises means for producing an indicia of when said switch means applies electricity to the motor at least once during a given number of cycles of the source voltage.

16. The apparatus as recited in claim 14 further comprising:

means for disabling said second means for controlling; and third means for controlling said switch means during alternate half-cycles of the voltage from the source following the disabling of said second means for controlling.

17. The apparatus as recited in claim 16 further comprising means for disabling said third means for controlling after a given interval of time has elapsed.

18. The apparatus as recited in claim 16 further comprising:

means for producing an indicia of both the sensed back emf voltage and the sensed voltage from the source having the same polarity when said second means for controlling controls said switch means; and wherein said second means for controlling responds to the indicia by altering the periodic pattern of current pulses.

19. The apparatus as recited in claim 18 wherein said second means for controlling alters the periodic pattern of current pulses to produce another fundamental frequency component of the source voltage frequency.

* * * * *

UNITED STATES PATENT AND TRADEMARK OFFICE
CERTIFICATE OF CORRECTION

PATENT NO. : 4,996,470

DATED : February 26, 1991

INVENTOR(S) : Timothy M. Rowan et al.

It is certified that error appears in the above-identified patent and that said Letters Patent is hereby corrected as shown below:

Delete Sheets 1-3 of the drawings and replace with accompanying 5 sheets containing Figures 1-6.

In Column 7, Line 32 after "step" insert --79--.

In Column 9, Line 21 delete ",".

In Column 13, Line 6 change "electric" to --electricity--.

Signed and Sealed this

Twenty-second Day of September, 1992

Attest:

DOUGLAS B. COMER

*Attesting Officer*  *Acting Commissioner of Patents and Trademarks*